US012742032B2

(12) United States Patent
Lawrence et al.

(10) Patent No.: US 12,742,032 B2
(45) Date of Patent: Sep. 22, 2026

(54) BONDED HYBRID POLYMER NON-POROUS PARTICLES AND THEIR USE FOR BIOSEPARATIONS

(71) Applicant: Waters Technologies Corporation, Milford, MA (US)

(72) Inventors: Nicole L. Lawrence, Stafford Springs, CT (US); Peng Chen, Lebanon, CT (US); Mingcheng Xu, Lexington, MA (US); Daniel P. Walsh, Danvers, MA (US); Matthew A. Lauber, North Smithfield, RI (US)

(73) Assignee: Waters Technolgoies Corporation, Milford, MA (US)

( * ) Notice: Subject to any disclaimer, the term of this patent is extended or adjusted under 35 U.S.C. 154(b) by 677 days.

(21) Appl. No.: 18/174,309

(22) Filed: Feb. 24, 2023

(65) Prior Publication Data

US 2024/0092959 A1 Mar. 21, 2024

Related U.S. Application Data

(60) Provisional application No. 63/401,494, filed on Aug. 26, 2022.

(51) Int. Cl.
*C08F 283/06* (2006.01)

(52) U.S. Cl.
CPC .................................. *C08F 283/06* (2013.01)

(58) Field of Classification Search
None
See application file for complete search history.

(56) References Cited

U.S. PATENT DOCUMENTS 4,017,528 A 4/1977 Unger et al.
6,528,167 B2 3/2003 O'Gara
6,686,035 B2 2/2004 Jiang et al.
7,175,913 B2 2/2007 O'Gara
7,919,177 B2 4/2011 Jiang et al.
(Continued)

FOREIGN PATENT DOCUMENTS

WO 2007038801 A2 4/2007
WO 2012018596 A2 2/2012
(Continued)

OTHER PUBLICATIONS

International Search Report and Written Opinion issued in International Application No. PCT/IB2023/051755 dated Jul. 10, 2023.
(Continued)

*Primary Examiner* — Jeffrey D Washville
(74) *Attorney, Agent, or Firm* — Womble Bond Dickinson (US) LLP; Deborah M. Vernon

(57) ABSTRACT

The present disclosure pertains to non-porous composite particles that are non-porous, polymer-based particles. In various embodiments, a non-porous polymer core is surface modified. In various embodiments, a non-porous hybrid organic-inorganic material is in contact with the modified surface of the core, and a bonding material is in contact with the non-porous hybrid organic-inorganic material. The present disclosure pertains to chromatographic separation devices that comprise such non-porous composite particles.

12 Claims, 9 Drawing Sheets

(56) References Cited

U.S. PATENT DOCUMENTS

| | | | | |
|---|---|---|---|---|
| 10,507,408 | B2 | 12/2019 | Wei | |
| 2004/0068035 | A1* | 4/2004 | Paiva | C09D 7/67 524/431 |
| 2010/0184913 | A1* | 7/2010 | Ebbrecht | A61K 8/11 524/588 |
| 2011/0049056 | A1 | 3/2011 | Wyndham et al. | |
| 2016/0184736 | A1* | 6/2016 | Wyndham | B01D 15/08 210/198.2 |
| 2019/0091657 | A1* | 3/2019 | Lawrence | B01J 20/285 |
| 2019/0322783 | A1* | 10/2019 | Brousmiche | C08F 212/08 |
| 2020/0384480 | A1 | 12/2020 | Liu et al. | |
| 2023/0073279 | A1 | 3/2023 | Xu et al. | |

FOREIGN PATENT DOCUMENTS

| | | | |
|---|---|---|---|
| WO | 2013173647 | A1 | 11/2013 |
| WO | 2014201033 | A1 | 12/2014 |
| WO | 2017155870 | A1 | 9/2017 |
| WO | 2018136666 | A1 | 7/2018 |
| WO | 2019168989 | A1 | 9/2019 |
| WO | 2022061039 | A1 | 3/2022 |
| WO | 2023026258 | A1 | 3/2023 |
| WO | 2024042370 | A1 | 2/2024 |
| WO | 2024042371 | A1 | 2/2024 |
| WO | 2024042373 | A1 | 2/2024 |

OTHER PUBLICATIONS

Fekete et al. “Fast liquid chromatography: The domination of core-shell and very fine particles.” J. Chromatogr. A. 1228(2012): 57-71.

Hayes et al. “Core-shell particles: Preparation fundamentals and applications in high performance liquid chromatography.” J. Chromatogr. A. 1357(2014): 36-52.

Sarma et al. “Polystyrene Core-Silica Shell Particles with Defined Nanoarchitectures as a Versatile Platform for Suspension Array Technology.” Langmuir. 32.15(2016): 3717-3727.

Tanaka et al. “Core-shell, ultra-small particles, monoliths and other support materials in high performance liquid chromatography.” Anal. Chem. 88.1(2016): 279-298.

Li et al. “Monodisperse Cross-Linked Core-Shell Polymer Microspheres by Precipitation Polymerization.” Macromol. 33 (2000): 4354-4360.

Li et al. “Precipitation polymerizatin for fabrication of complex core-shell hybrid particles and hollow structures.” Chem. Soc. Rev. 42(2013): 3628.

Qi et al. “Synthesis of core-shell polymer microspheres by two-stage distillation-precipitation polymerization.” Eur. Poly. J. 41(2005): 2320-2328.

* cited by examiner

BONDED HYBRID POLYMER NON-POROUS PARTICLES AND THEIR USE FOR BIOSEPARATIONS

CROSS-REFERENCE TO RELATED APPLICATIONS

This application claims priority to and the benefit of U.S. Provisional Application Ser. No. 63/401,494, filed Aug. 26, 2022, and entitled "Bonded Hybrid Polymer Non-Porous Particles And Their Use For Bioseparations." The foregoing application is incorporated herein by reference in its entirety.

FIELD OF TECHNOLOGY

The present technology is directed to chromatographic materials. More particularly, the present technology is directed to non-porous composite particles for use in chromatographic separations. In general, the non-porous composite particles comprise a surface modified non-porous polymer core, a non-porous hybrid organic-inorganic material in contact with the surface modified core, and a bonding material in contact with the non-porous hybrid organic-inorganic material. Some embodiments feature a non-porous composite particle including a modified non-porous polymer core with a bonding material.

BACKGROUND

Chromatography is a separation process involving two phases, one stationary and the other mobile. Typically, the stationary phase is a porous or non-porous particle that is packed into a column. The mobile phase flows through the packed column. The sample, or analytes, to be separated is injected at the beginning of the column and is transported through the system by the mobile phase. In their travel through the column, the different components of the sample distribute themselves according to their relative affinity for the two phases. The results of the chromatographic separation is then depicted via a chromatogram, where the sample components can be identified by various peaks or patterns of the chromatogram.

Measuring the degree of separation between two components is commonly referred to as the resolution of each component. The resolution can be determined by efficiency, selectivity, and retention of the separation process. Efficiency refers to the quality of separation of the sample components, which is typically determined by the number of peaks that can be separated in the chromatogram. Selectivity refers to the ability of the chromatographic method to separate the components of the sample and is typically measured by a ratio of the retention of two peaks in question of the chromatogram and can be visualized as the distance between the apices of the two peaks. Retention, or retention time, refers to the time required for the sample to pass through the chromatographic column, and is typically measured as the interval of time between the injection of the sample and the detection of its components on the chromatogram.

Adjustment of mobile phase pH is a powerful tool to improve retention and selectivity in chromatographic separation of analytes, especially of ionizable analytes. A high pH mobile phase combined with elevated temperature is typically used to gain extended retention, excellent peak shape and good efficiency in reversed phase chromatographic separation of basic compounds, peptides, and biological samples. Silica-based stationary phases have been preferred in the past, due to its stability at neutral pH and high temperature. However, a common drawback is the instability of silica-based stationary phases at high pH due to particle erosion caused by dissolution, which in turn limits its use in those applications. An alternative to silica based stationary phases is to use a polymer-based stationary material. Polymer-based stationary particles have showed some promise, but also have some limitations in choice of the desired surface chemistries.

Mass transfer and lateral diffusion properties are paramount in the high-resolution separation of large biomolecules. However, in the separation of large biomolecules, the diffusion paths that analytes must traverse between the non-porous stationary phase and mobile phase is very short, and column efficiency becomes independent of the flow rate. Accordingly, non-porous particles for use as a stationary phase that have the ability to remain stable at high pH and obtain a high-resolution of separation of large biomolecules is desirous.

SUMMARY OF TECHNOLOGY

The present technology is directed to non-porous composite particles for use in chromatographic separations. In particular, the embodiments of the present technology relate to chromatographic separations of large biomolecules.

In general, the technology disclosed herein is directed to non-porous composite particles. In one embodiment, the technology is directed to a non-porous composite particle including a surface-modified non-porous polymer core, a non-porous hybrid organic-inorganic material in contact with the surface-modified non-porous polymer core, and a bonding material in contact with the non-porous hybrid organic-inorganic material. That is, embodiments of the present disclosure are directed to a non-porous composite particle including a non-porous polymer particle core having a modified surface, a non-porous hybrid organic-inorganic material in contact with the modified surface, and a bonding material in contact with the non-porous hybrid organic-inorganic material. In certain embodiments, the modified surface is a silyl-modified surface comprising a first functionality and a second functionality. In certain embodiments the non-porous hybrid organic-inorganic material is modified with the bonding material. As a result of using such non-porous particles in a stationary phase of a chromatographic separation, the non-porous particles are able to remain stable at high pH and obtain a high-resolution of separation of large biomolecules, such as those with a hydrodynamic radius that exceed 300 Å, with some even exceeding 1000 Å.

In another embodiment, the technology is directed to a non-porous composite particle including a silyl modified non-porous polymer core. A bonding material is applied to the silyl modified surface to provide the non-porous composite particle with functionality.

In one aspect, the present technology directed to a non-porous composite particle comprising a non-porous polymer particle core having a silyl modified surface, a non-porous hybrid organic-inorganic material in contact with the silyl modified surface, and a bonding material in contact with the non-porous hybrid organic-inorganic material.

The above aspect can include one or more of the following features. The non-porous polymer particle core of the non-porous composite particles, in some embodiments, comprises divinylbenzene 80%. In some embodiments, at least a portion of the non-porous hybrid organic-inorganic material is bonded to the silyl modified surface of the non-porous particle core through silane-based bonding. In some embodiments, at least a portion of the non-porous hybrid organic-inorganic material is a silane to form a functionalized surface. In some embodiments, the functionalized surface of the non-porous hybrid organic-inorganic material is hydrophilic. In some embodiments, the silane comprises a hydroxy-terminated polyethylene glycol (HO-PEG) silane. In some embodiments, at least a portion of the non-porous hybrid organic-inorganic material is an alkyl silane to form a functionalized surface. In some embodiments, the functionalized surface of the non-porous hybrid organic-inorganic material is hydrophobic. In some embodiments, at least a portion of the non-porous hybrid organic-inorganic material is an ionizable silane to form a functionalized surface. In some embodiments, the functionalized surface of the non-porous hybrid organic-inorganic material is charged. In some embodiments, the silyl modified surface of the non-porous polymer particle core comprises a first functionality and a second functionality, the first functionality comprising a reactive silane and the second functionality comprising an organic polymerizable group. In some embodiments, the reactive silane comprises an alkoxy. In some embodiments, the organic polymerizable group comprises vinyl.

In another aspect, the present technology is directed to a non-porous particle comprising a non-porous polymer particle core having a silyl modified surface, and a bonding material in contact with the silyl modified surface of the non-porous polymer particle core.

The above aspect can include one or more of the following features. The non-porous polymer particle core of the non-porous composite particles, in some embodiments, comprises divinylbenzene (80%). In some embodiments, at least a portion of bonding material is bonded to the modified surface of the non-porous particle core through silane-based bonding. In some embodiments, at least a portion of the bonding material is a silane to form a functionalized surface. In some embodiments, the functionalized surface is hydrophilic. In some embodiments, at least a portion of bonding material is an alkyl silane to form a functionalized surface. In some embodiments, the functionalized surface of the bonding material is hydrophobic. In some embodiments, at least a portion of the bonding material is an ionizable silane to form a functionalized surface. In some embodiments, the functionalized surface of the bonding material is charged. In some embodiments, the silyl modified surface of the non-porous polymer particle core comprises a first functionality and a second functionality, the first functionality comprising a reactive silane and the second functionality comprising an organic polymerizable group. In some embodiments, the reactive silane comprises an alkoxy. In some embodiments, the organic polymerizable group comprises vinyl.

The present technology provides numerous advantages over current means of chromatographic separation. For instance, using a non-porous composite particle described herein can provide a high-resolution of separation of large biomolecules. That is, a non-porous polymer particle core including a silyl-modified surface, a non-porous hybrid organic-inorganic material in contact with the silyl-modified surface, and a bonding material in contact with non-porous hybrid organic-inorganic material can provide better separation of large biomolecules than the current means used in the industry. The present technology can remain stable at high pH. As a result, chromatographic separations using the non-porous composite particle described herein can lead to extended retention, better peak shape, and more efficient separation of large biomolecules.

BRIEF DESCRIPTION OF THE DRAWINGS

The foregoing and other features and advantages provided by the present technology will be fully understood from the following description of exemplary embodiments when read together with the accompanying drawings.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
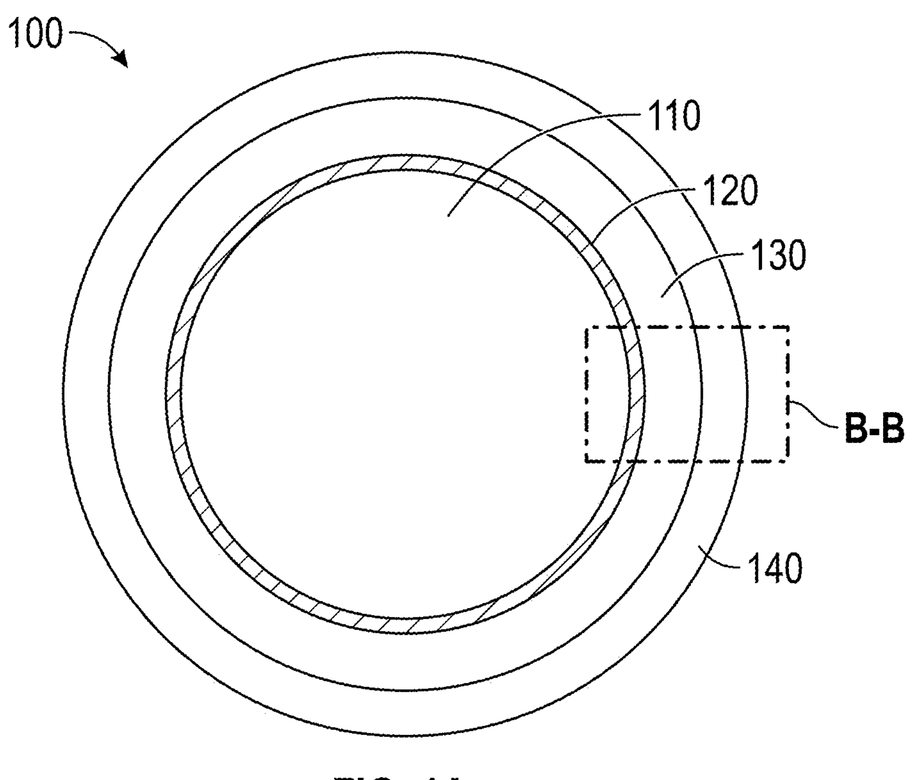
FIG. 1A is a cross-sectional schematic illustration of a non-porous composite particle, in accordance with an embodiment of the present disclosure.

The present disclosure pertains to non-porous composite particles that include a non-porous polymer particle core with a modified surface (e.g., a silyl-modified surface), a non-porous hybrid organic-inorganic material in contact with the modified surface, and a bonding material in contact with the non-porous hybrid organic-inorganic material. That is, embodiments of the present disclosure are directed to a non-porous particle including a surface modified non-porous polymer (e.g., organic material) particle core, a hybrid organic-inorganic non-porous material in contact with the modified surface, and a bonding material in contact with the non-porous hybrid organic-inorganic material and/or modified surface. In some embodiments, the modified surface is a silyl-modified surface comprising a first functionality (i.e., a reactive silane) and a second functionality (i.e., an organic polymerizable group).

As shown in FIGS. 1A-3C, a non-porous particle (100; 200; 300) according to embodiments of the present disclosure are provided. The non-porous particles (100; 200; 300) a non-porous polymer particle core (110; 210; 310), a modified surface (120; 220; 320) of the non-porous polymer particle core (110; 210; 310), a hybrid organic-inorganic non-porous material (130; 230; 330) about the modified surface (120; 220; 320), and a bonding material (140; 240; 340). The hybrid organic-inorganic non-porous material (130; 230; 330) may be deposited or grown upon the modified surface (120; 220; 320). The modified surface (120; 220; 320) and/or the hybrid organic-inorganic non-porous material (130; 230; 330) may include the bonding material (140; 240; 340).

The non-porous particles of the present disclosure are typically spherical. The non-porous particles of the present disclosure typically range from 1 to 14 microns in diameter, more typically, from 1 to 6 microns in diameter. Particle diameter is measured herein by Coulter Counter ((Beckman Coulter, Multisizer 4e Coulter Counter, Brea, CA, USA) by dispersing a sample in methanol containing 5% lithium chloride. A greater than 70,000 particle count is run using a 30 μm aperture in the volume mode for each sample. Using the Coulter principle, volumes of particles are converted to diameter, where a particle diameter is the equivalent spherical diameter, which is the diameter of a sphere whose volume is identical to that of the particle. Particle diameter measured as the 50% cumulative diameter of the volume based particle size distribution.

The non-porous particles of the present disclosure have good stability, even at pH's greater than 12 and less than 1, in some embodiments. For example, in an embodiment, non-porous particles in accordance with present technology exhibited less than 4% weight loss after a 12 hour exposure to an aqueous solution having a pH of 12.3. Columns packed with these non-porous particles and exposed to basic conditions showed minimum loss in separation performance.

The non-porous particles of the present disclosure are also typically narrowly dispersed in particle size. As defined herein, a collection of particles is "narrowly dispersed in particle size" when a ratio of 90% cumulative volume diameter divided by the 10% cumulative volume diameter is less than 1.4 when measured by Beckman Coulter, Multisizer 4e Coulter Counter.

Non-Porous Polymer Core.

The polymer particle cores for use in the present disclosure comprise at least one organic polymer. The organic polymer cores typically contain more than 95% organic polymer, more typically more than 97.5% organic polymer, even more typically more than 99% organic polymer.

The polymer particle cores are non-porous, which is defined herein to mean that the polymer particle cores have a pore volume that is less than 0.1 cc/g. Preferably, organic polymer cores have a pore volume that is less than 0.1 cc/g (e.g., 0.05 cc/g), and preferably less than 0.02 cc/g, in some embodiments. Pore volume is determined using methods known in the art based on multipoint nitrogen sorption experiments (Micromeritics ASAP 2400; Micromeritics Instruments Inc., Norcross, GA).

The polymer cores typically range, for example, from 1 to 10 microns in diameter, more typically, from 1 to 5 microns in diameter. The polymer cores are typically narrowly distributed in particle size.

Elementally, polymer particle cores for use in the present disclosure include those that are composed of carbon and hydrogen, those composed of carbon, hydrogen and oxygen, those composed of carbon, hydrogen and nitrogen, and those composed of carbon, hydrogen, nitrogen and oxygen. The backbones of the organic polymer chains forming the polymer cores may contain C—C, C—O, C—N and/or O—N covalent bonds. In some embodiments (e.g., in the case of a polymer formed by radical polymerization of vinyl groups), the backbone of the at least one organic polymer chains may contain only C—C covalent bonds.

As noted above polymer cores for use in the present disclosure comprise at least one organic polymer. The at least one organic polymer comprises residues of one or more organic monomers. The one or more organic monomers residues forming the least one organic polymer may be selected from residues of hydrophobic organic monomers, residues of hydrophilic organic monomers, or a mixture of residues of hydrophobic organic monomers and residues of hydrophilic organic monomers.

Hydrophobic organic monomers may be selected, for example, from a C2-C18 olefin monomer and/or a monomer comprising a C6-C18 monocyclic or multicyclic carbocyclic group (e.g., a phenyl group, a phenylene group, naphthalene group, etc.). Specific examples of hydrophobic organic monomers include, for example, monofunctional and multifunctional aromatic monomers such as styrene, alkyl substituted styrene, halo substituted styrene, divinylbenzene, and vinylbenzyl chloride, monofunctional and multifunctional olefin monomers such as ethylene, propylene or butylene, monofunctional and multifunctional fluorinated monomers such as fluoroethylene, 1,1-(difluoroethylene), tetrafluoroethylene, chlorotrifluoroethylene, hexafluoropropylene, perfluoropropylvinylether, or perfluoromethylvinylether, monofunctional or multifunctional acrylate monomers having a higher alkyl or carbocyclic groups, for example, monofunctional or multifunctional acrylate monomers having a C6-C18 alkyl, alkenyl or alkynyl group or a C6-C18 saturated, unsaturated or aromatic carbocyclic group, monofunctional or multifunctional methacrylate monomers having a higher alkyl or carbocyclic group, for example, monofunctional or multifunctional methacrylate monomers having a C6-C18 alkyl, alkenyl or alkynyl group or a C6-C18 saturated, unsaturated or aromatic carbocyclic group, among others.

Hydrophilic organic monomers may be selected, for example, from monofunctional or multifunctional organic monomers having an amide group, monofunctional or multifunctional organic monomers having an ester group, monofunctional or multifunctional organic monomers having a carbonate group, monofunctional or multifunctional organic monomers having a carbamate group, monofunctional or multifunctional organic monomers having a urea group, monofunctional or multifunctional organic monomers having a hydroxyl group, and monofunctional or multifunctional organic monomers having a nitrogen-containing heterocyclic group, among other possibilities. Specific examples of hydrophilic organic monomers include, for example, vinyl pyridine, N-vinylpyrrolidone, N-vinyl-piperidone, N-vinyl caprolactam, lower alkyl acrylates (e.g., methyl acrylate, ethyl acrylate, etc.), lower alkyl methacrylates (e.g., methyl methacrylate, ethyl methacrylate, etc.), vinyl acetate, acrylamide or methacrylamide monomers, hydroxypolyethoxy allyl ether monomers, ethoxy ethyl methacrylate, glycidyl methacrylate, ethylene glycol dimethacrylate, methylene bisacrylamide, allyl methacrylate, or diallyl maleate.

In various embodiments, the non-porous polymer cores comprise residues of multifunctional hydrophobic organic monomers such as divinylbenzene and/or multifunctional hydrophilic organic monomers, such as ethylene glycol dimethacrylate, methylene bisacrylamide or allyl methacrylate, in order to provide crosslinks in the organic copolymer. In certain embodiments, DVB 80 may be employed, which is an organic monomer mixture that comprises divinylbenzene (80%) as well as a mixture of ethyl-styrene isomers, diethylbenzene, and can include other isomers as well.

In various embodiments, the polymer core may comprise residues of only multifunctional organic monomers. In various embodiments, the polymer may comprise residues of both multifunctional organic monomers and monofunctional organic monomers.

The present inventors have found that, in some embodiments, the porosity of a material formed from an polymer containing multifunctional organic monomer residues can be reduced by adding monofunctional organic monomer residues to the polymer, or that the porosity of a material formed from a polymer containing multifunctional organic monomer residues and monofunctional organic monomer residues can be reduced by increasing an amount of the monofunctional organic monomer residues relative to the multifunctional organic monomer residues in the polymer. For example, it has been found that polymer particle cores formed from DVB 80 (which are formed from organic polymers containing 80% multifunctional divinyl benzene monomer residues and monofunctional ethylstyrene monomer residues as explained above) have a porosity of about 0.015 cc/g, whereas organic polymer cores formed from DVB 80 and styrene (which contain multifunctional divinyl benzene monomer residues, monofunctional ethylstyrene monomer residues, and additional monofunctional styrene monomer residues) have a porosity of less than 0.007 cc/g.

In some embodiments, polymer particle cores are created in which a central region of the cores is formed from an organic copolymer containing multifunctional organic monomer residues and monofunctional organic monomer residues and an outer region of the cores is formed from an organic homopolymer containing only multifunctional organic monomer residues. In some embodiments, organic polymer cores are created in which a central region of the cores is formed from an organic copolymer containing multifunctional organic monomer residues and monofunctional organic monomer residues and an outer region of the cores is also formed from an organic copolymer containing multifunctional organic monomer residues and monofunctional organic monomer residues, but wherein a molar ratio of the multifunctional organic monomer residues relative to the monofunctional organic monomer residues is increased in the outer core region relative to the central core region. In a particular example, organic polymer cores are created in which a central region of the cores is formed from DVB and styrene and an outer region of the cores is formed from DVB. In other embodiment, the molar ratio of the multifunctional organic monomer residues relative to the monofunctional organic monomer residues is decreased in the outer core region relative to the central core region.

In various embodiments, an entire polymer particle core may be formed from an organic polymer that comprises residues of multifunctional organic monomers but does not contain resides of monofunctional organic monomers. In various embodiments, an entire polymer particle core may be formed from an organic polymer that comprises residues of both multifunctional organic monomers and monofunctional organic monomers.

The polymers forming the polymer particle cores can be prepared via a number of processes and mechanisms including, but not limited to, chain addition and step condensation processes, radical, anionic, cationic, ring-opening, group transfer, metathesis, and photochemical mechanisms. In particularly beneficial embodiments, the non-porous polymer particle cores are prepared via free radical polymerization.

The polymer particle cores of the present disclosure can be prepared in some embodiments by a dispersion polymerization process in which a homogeneous solution is formed, wherein monomers, initiator and stabilizer are combined in a solvent or solvent mixture. As polymerization proceeds, the initially formed polymers precipitate from the homogeneous solution to form nuclei. The nuclei that form still bear reactive sites such as radicals which allow them to keep growing by continuous capture and incorporation of monomers and/or oligomers from the solution.

In an exemplary process based on radical polymerization, one or more solvents and one or more stabilizers are purged with nitrogen to remove dissolved oxygen. Then, one or more monomers, including at least one multifunctional monomer, and a radical polymerization initiator are added. Radical polymerization is initiated by raising the temperature for several hours, typically under agitation. Based on the desired particle diameter, further radical polymerization initiator and further monomer may be added to the reaction mixture to allow the particle further to grow to the desired size. After reaction, the particles may be thoroughly washed and dried under vacuum.

Any radical initiator that is compatible with the organic phase may be used, either alone or in a mixture of such radical initiators. In particular embodiments, the radical initiators are capable of being heat activated or photoactivated. In specific embodiments, the radical initiator is a peroxide, a peroxyacetate, a persulfate, an azo initiator or a mixture thereof.

Where the initiator is a thermal initiator, the resulting solution may then be heated to an elevated temperature under agitation to activate the thermal initiator(s) and maintained at elevated temperature until polymerization is complete. Where the initiator is a photoinitiator, the resulting solution may then be illuminated under agitation with light having a suitable wavelength to activate the photoinitiator(s) and maintained until polymerization is complete. Suitable organic monomers for use in the organic phase are described above.

Solvent systems for the formation of polymer particle cores include methanol, ethanol, isopropanol, 2-methoxyehanol, water, acetonitrile, p-xylene, and toluene.

Stabilizers that can be employed for the formation of polymer particle cores include, for example, polyvinylpyrrolidone (PVP), non-ionic surfactants including alkylphenol ethoxylates (e.g., Triton™ N-57, available from Dow Chemical), polyvinyl alcohol (PVA) such as Selvol™ Polyvinyl Alcohol solution, available from Sekisui Special Chemicals), modified celluloses, including alkyl-modified celluloses such as methyl celluloses (e.g., Methocel™, available from DuPont) and hydrophobically modified celluloses hydroxyethylcellulose stabilizers such as Natrosol™ cetyl modified hydroxyethylcellulose (available from Ashland), and ionic surfactants including sodium alkyl sulfates such as sodium dodecyl sulfate (SDS) and sodium oleyl sulfate, among others.

In a particular embodiment of non-porous polymer particle core formation, the monomer is a combination of DVB and styrene, the initiator is 2,2'-Azobis(2-methylpropionitrile) (AIBN), the solvent system is a combination of reagent alcohol and p-xylene, and the stabilizer is polyvinyl pyrrolidone (PVP 40).

Once formed, the organic polymer cores may contain surface moieties from which further polymerization can proceed. For example, non-porous polymer particle cores formed from free radical polymerization commonly contain residual radical-polymerizable unsaturated surface moieties (e.g., ethylenyl moieties, vinyl moieties, methacryloxy moieties, or acryloxy moieties, etc.), from which further core growth can proceed. Such further polymerization may be used to increase the size of a given batch of polymer particle cores by adding an additional thickness of non-porous organic polymer to previously formed non-porous polymer particle cores.

In a particular embodiment of non-porous polymer particle core growth, the monomer is DVB, the solvent is reagent alcohol, and the stabilizer is polyvinyl pyrrolidone (PVP 40).

Surface-Modified Non-Porous Polymer Core.

In some embodiments, the application is directed to a non-porous polymer particle with a modified surface. The modified surface of the non-porous polymer particle, in some embodiments, can form a covalent or electrostatic bond with a subsequently applied non-porous hybrid organic-inorganic material. In certain embodiments, the modified surface of the non-porous polymer core is a silyl modified surface. The silyl modified surface includes a first functionality and a second functionality. For example, the first functionality is a reactive silane (e.g., alkoxy) and the second functionality is an organic polymerizable group (e.g., vinyl).

In some embodiments, the modified surface of the non-porous polymer particle core can have a thickness ranging from 1 to 300 nm, for example ranging anywhere from 1 to 3 to 10 to 30 to 100 to 300 nm (i.e., ranging between any two of the preceding values).

In some embodiments, the modified surface includes a surface polymer, which may comprise functional groups that covalently or electrostatically bond to the hybrid organic-inorganic non-porous. Examples of functional groups that electrostatically bond to the hybrid organic-inorganic non-porous include amide functional groups and amine functional groups. In this regard, the hybrid organic-inorganic materials described herein are weakly acidic in nature and thus tend to be deprotonated and negatively charged, whereas the amide functional groups or amine functional groups described herein are basic in nature and thus tend to be protonated and positively charged. Examples of functional groups that covalently bond to the non-porous hybrid organic-inorganic material include organosilane functional groups, and organometallic functional groups such as organotitanium functional groups and organozirconium functional groups, among others. As used herein, an organosilane functional group is a functional group having at least one Si—C bond. Similarly, an organotitanium functional group is a functional group having at least one Ti—C bond, and an organozirconium functional group is a functional group having at least one Zr—C bond.

In some embodiments, the modified surface includes a surface polymer, which may comprise monomer residues that covalently or electrostatically bond to the non-porous hybrid organic-inorganic material. Examples of monomer residues that electrostatically bond to the non-porous hybrid organic-inorganic material include amide monomer residues and amine monomer residues. Examples of monomer residues that are covalently bonded to the non-porous hybrid organic-inorganic material include organosilane monomer residues, organotitanium monomer residues, and organozirconium monomer residues. As used herein, an organosilane monomer residue is a monomer residue having at least one Si—C bond, an organotitanium monomer residue is a monomer residue having at least one Ti—C bond, and an organozirconium monomer residue is a monomer residue having at least one Zr—C bond.

The surface polymer may, comprise, for example, polymer chains that are grafted on the non-porous polymer core.

The surface polymer may, comprise, for example, a crosslinked polymer network that is formed on the non-porous polymer particle core.

Surface polymers can be prepared via a number of processes and mechanisms including, but not limited to, chain addition and step condensation processes, radical, anionic, cationic, ring-opening, group transfer, metathesis, and photochemical mechanisms. In particularly beneficial embodiments, the non-porous organic polymer cores are prepared via free radical polymerization.

As noted above, polymer particle cores may contain surface moieties from which further polymerization can proceed. For example, organic polymer cores formed from free radical polymerization commonly contain residual radical-polymerizable unsaturated surface moieties (e.g., ethylenyl moieties, vinyl moieties, methacryloxy moieties, acryloxy moieties, etc.), from which polymerization of the surface polymer can proceed. Polymer chains can be from monofunctional monomers. Crosslinked polymer networks can be formed from multifunctional monomers. Monofunctional monomers may be included in addition to multifunctional monomers in such crosslinked polymer networks.

As noted above, surface polymers include those comprising amide monomer residues. Examples of amide monomer residues include amide monomer residues having the formula,

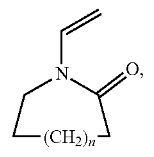

wherein n is an integer from 1-3 (i.e., N-vinyl pyrrolidone, N-vinyl-2-piperidinone or N-vinyl caprolactam). Examples of amide monomer residues also include amide monomer residues having the formula

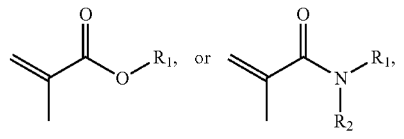

wherein R1 is selected from C1-C6 alkylene, C2-C6 alkenylene, C2-C6 alkynylene, C6-C18 arylene groups, and wherein R2 is selected from H, C1-C6 alkylene, C2-C6 alkenylene, C2-C6 alkynylene, C6-C18 arylene groups.

As also noted above, surface polymers include those comprising amine monomer residues. Examples of amine monomer residues include aminoalkyl acrylates, aminoalkyl methacrylates, dialkylaminoalkyl acrylates, or dialkylaminoalkyl methacrylates, including amino-C1-C4-alkyl acrylates, amino-C1-C4-alkyl methacrylates, di-C1-C4-alkylamino-C1-C4-alkyl acrylates, di-C1-C4-alkylamino-C1-C4-alkyl methacrylates, such as 2-aminoethyl acrylate, 2-aminoethyl methacrylate, 2-(N,N-dimethylamino)ethyl acrylate, 2-(N,N-dimethylamino)ethyl methacrylate, 2-(N,N-diethylamino)ethyl methacrylate, or 2-diisopropylaminoethyl methacrylate.

As further noted above, examples of surface polymers further include those comprising silane monomer residues that are electrostatically bonded to the non-porous hybrid organic-inorganic material. In some embodiments, the surface polymers comprise residues of one or more radical polymerizable organosilane monomers.

Specific examples of radical polymerizable organosilane monomers include unsaturated organosilane monomers (e.g., unsaturated organoalkoxysilane monomers, unsaturated organochlorosilane monomers, etc.), such as alkenyl- or alkynyl-functionalized organosilane monomers (e.g., alkenyl- or alkynyl-functionalized organoalkoxysilane monomers, alkenyl- or alkynyl-functionalized organochlorosilane monomers, etc.). Particular alkenyl-functionalized organoalkoxysilane monomers including those with vinyl groups, methacryloxy groups, and acryloxy groups. Specific examples include 3-(trimethoxysilyl)propyl methacrylate (also so known as 3-methacryloxypropyltrimethoxysilane, or MAPTMOS), methacryloxypropyltriethoxysilane, methacryloxypropyltrichlorosilane, vinyltriethoxysilane (VTES), vinyltrimethoxy silane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl) urethane, N-(3-methacryl oxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris(methoxyethoxy)silane, or 3-(N-styrylmethyl-2-aminoethylamino)propyltrimethoxysilane hydrochloride, among others.

In a particular embodiment of a process for forming a surface modified non-porous organic polymer core, an organosilane polymer, specifically, a poly(styryl-C1-C4-alkyl-tri-C1-C4-alkoxysilane), is formed by copolymerizing a styryl-C1-C4-alkyl-tri-C1-C4-alkoxysilane monomer where R is C1-C4 alkyl, with residual vinyl groups (e.g., residues of divinylbenzene) on a non-porous organic polymer core. Examples of styrene-based organosilane monomers include styrylethyltrimethoxysilane and styryltrimethoxysilane.

Hybrid Organic-Inorganic Non-Porous Material.

As previously noted, the present disclosure pertains to non-porous particles in which a modified surface of a non-porous polymer core is in contact with a non-porous hybrid organic-inorganic material. The non-porous hybrid organic-inorganic material may be deposited or grown upon the modified surface.

In some embodiments, the non-porous hybrid organic-inorganic material may have a thickness ranging for, for example, 1 nm to 4 microns, typically, from 25 nm to 200 nm. In some embodiments, the non-porous hybrid organic-inorganic material may have a pore volume, for example, less than 0.10 cc/g (e.g., 0.05 cc/g), typically, less than 0.02 cc/g.

An "organic-inorganic hybrid" material includes inorganic-based structures wherein an organic functionality is integral to both the internal or "skeletal" inorganic structure as well as the hybrid material surface. The inorganic portion of the hybrid material may be, e.g., silica, alumina, titanium, cerium, or zirconium or oxides thereof, or ceramic material. Exemplary hybrid materials are shown in U.S. Pat. Nos. 4,017,528, 6,528,167, 6,686,035, 7,175,913 and 7,919,177, the disclosures of which are hereby incorporated in their entirety.

In some embodiments, the non-porous hybrid organic-inorganic material may comprise a silicon-based hybrid organic-inorganic material that includes hybrid regions in which the silicon-based hybrid organic-inorganic material comprises silicon atoms having one or more silicon-oxygen bonds and one or more silicon-carbon bonds. In some cases, the hybrid regions may comprise a substituted or unsubstituted alkylene, alkenylene, alkynylene or arylene moiety bridging two or more silicon atoms. For example, the hybrid regions may comprise a substituted or unsubstituted C1-C18 alkylene, C2-C18 alkenylene, C2-C18 alkynylene or C6-C18 arylene moiety bridging two or more silicon atoms. In some embodiments, the hybrid regions may comprise a substituted or unsubstituted C1-C6 alkylene moiety bridging two or more silicon atoms, including methylene, dimethylene or trimethylene moieties bridging two silicon atoms. In some embodiments, the hybrid regions may comprise ≡Si—(CH2)n-Si≡ moieties, where n is an integer, and may be equal to 1, 2, 3, 4 or more. In some embodiments, the non-porous hybrid organic-inorganic material may comprise a silicon-based hybrid organic-inorganic material that further comprises inorganic regions in which the material comprises silicon atoms having four silicon-oxygen bonds, in addition to hybrid regions in which the material comprises silicon atoms having one or more silicon-oxygen bonds and one or more silicon-carbon bonds.

In various embodiments, non-porous hybrid organic-inorganic materials may be formed by hydrolytically condensing one or more organosilane compounds on surface modified non-porous organic polymer cores, such as those described above. As used herein, an organosilane compound is a silane compound having at least one Si—C bond.

The organosilane compounds may comprise, for example, (a) one or more organosilane compounds of the formula SiZ1Z2Z3Z4, where Z1, Z2, Z3 and Z4 are independently selected from Cl, Br, I, C1-C4 alkoxy, C1-C4 alkylamino, and C1-C4 alkyl, where at least one of Z1, Z2, Z3 and Z4 is C1-C4 alkyl, examples of which include alkyl-trialkoxysilanes such as C1-C4-alkyl-tri-C1-C4-alkoxysilanes, including methyl triethoxysilane, methyl trimethoxysilane, ethyl trimethoxysilane or ethyl triethoxysilane, and dialkyl-dialkoxysilanes, for example, C1-C4-dialkyl-di-C1-C4-alkoxysilanes, such as dimethyl diethoxysilane, dimethyl dimethoxysilane, diethyl dimethoxysilane or diethyl diethoxysilane, among many other possibilities and/or (b) one or more organosilane compounds of the formula Z1Z2Z3Si—R—SiZ4Z5Z6, where Z1, Z2 and Z3 are independently selected from Cl, Br, I, C1-C4 alkoxy, C1-C4 alkylamino, and C1-C4 alkyl, although at most two of Z1, Z2 and Z3 can be C1-C4 alkyl, where Z4, Z5 and Z6 are independently selected from Cl, Br, I, C1-C4 alkoxy, C1-C4 alkylamino, and C1-C4 alkyl, although at most two of Z4, Z5 and Z6 can be C1-C4 alkyl, and where R is an organic radical, for example, selected from C1-C18 alkylene, C2-C18 alkenylene, C2-C18 alkynylene or C6-C18 arylene groups, typically, C1-C4 alkylene, typically, C1-C6 alkylene. Examples of compounds of the formula Z1Z2Z3Si—R—SiZ4Z5Z6 include bis(trialkoxysilyl)alkanes, for instance, bis(tri-C1-C4-alkoxysilyl)C1-C4-alkanes such as bis(trimethoxysilyl)methane, bis(trimethoxysilyl)ethane, bis(triethoxysilyl)methane, and bis (triethoxysilyl)ethane, among many other possibilities.

In some embodiments, one or more additional non-organosilane compounds may be hydrolytically condensed along with the one or more organosilane compounds. Such compounds include silane compounds of the formula SiZ1Z2Z3Z4, where Z1, Z2, Z3 and Z4 are independently selected from Cl, Br, I, C1-C4 alkoxy and C1-C4 alkylamino. In certain embodiments the additional silane compounds are tetra-C1-C4-alkoxysilanes such as tetramethoxysilane or tetraethoxysilane.

In some embodiments, non-porous hybrid organic-inorganic materials may be formed by hydrolytically condensing the following on a surface modified non-porous organic polymer core as described above: (a) one or more alkyoxysilanes, for example, tetraalkoxysilanes (e.g., tetramethoxysilane (TMOS), tetraethoxysilane (TEOS), etc.) and (b) one or more organosilanes, for example, selected from bis(trialkoxysilyl)alkanes (e.g., bis(trimethoxysilyl)methane, bis (trimethoxysilyl)ethane, bis(triethoxysilyl)methane, bis(triethoxysilyl)ethane (BTEE), etc.) and/or alkyltrialkoxysilanes (e.g., methyl trimethoxysilane, methyl triethoxysilane (MTOS), ethyl triethoxysilane, etc.). Where the plurality of silane compounds comprises one or more bis(trialkoxysilyl)alkanes, alkyl-bridged hybrid organic-inorganic materials are prepared, which can offer various advantages over conventional silica-based materials, including chemical and mechanical stability. When BTEE is employed as a monomer, the resulting materials are ethylene bridged hybrid (BEH) materials. One particular BEH material can be formed from hydrolytic condensation of TEOS and BTEE.

In some embodiments, a plurality of silane compounds as described above, for example, a plurality of silane compounds comprising one or more organosilanes and one or more tetraalkoysilanes are partially condensed to form a polyalkoxyorganosiloxane oligomer, which is then hydrolytically condensed onto a surface modified non-porous organic polymer core. For example, BTEE and TEOS can be partially condensed to form a polyethoxyorganosiloxane oligomer (PEOS), which is hydrolytically condensed onto a surface modified non-porous organic polymer core.

In various embodiments, a non-porous hybrid organic-inorganic material may be formed by creating (typically in a series of steps) a reaction mixture comprising the following components: surface modified non-porous organic polymer cores, ethanol, one or more silanes including one or more organosilanes as previously described (e.g., TEOS and BTEE, or PEOS), water, and a basic or acidic catalyst to promote silane hydrolysis and condensation of non-porous hybrid organic-inorganic material on the surface modified non-porous organic polymer cores. In some embodiments, the hydrolysis proceeds at room temperature. In some embodiments, the mixture may be heated to drive the hydrolysis reaction to completion. In some embodiments, the mixture is agitated. After forming the non-porous hybrid organic-inorganic material, the resulting particles may be washed and dried.

In other embodiments, a non-porous hybrid organic-inorganic material may be formed by interaction between a template surfactant (e.g., and ionic surfactant such as cetyltrimethyl ammonium bromide (CTAB) or trioctylmethylammonium bromide (TOMB)) and one or more silanes including one or more organosilanes as previously described (e.g., TEOS and BTEE, or PEOS) during continuous addition of silanes, basic catalyst and template surfactant to surface modified non-porous organic polymer cores. This process leads to continuous silane hydrolysis and condensation of hybrid organic-inorganic reaction product on the cores. The reaction may be conducted at room temperature or at elevated temperatures.

One or more organosilanes as previously described (e.g., TEOS and BTEE, or PEOS) may be hydrolyzed in the presence of a surface modified non-porous (NP) organic polymer core having a surface polymer that comprises monomer residues of amide monomers and/or silane monomers such that the hydrolyzed organosilanes form a non-porous hybrid organic-inorganic material on the core.

Potential advantages of the non-porous composite particles of the present disclosure include improvements in mass transfer and increased efficiencies relative to traditional silica-based non-porous particles, along with improved pH stability. The non-porous composite particles of the present technology can be used as chromatography packing materials for the separation of both small molecules and large biologics.

Bonding Material.

Figure 1B:
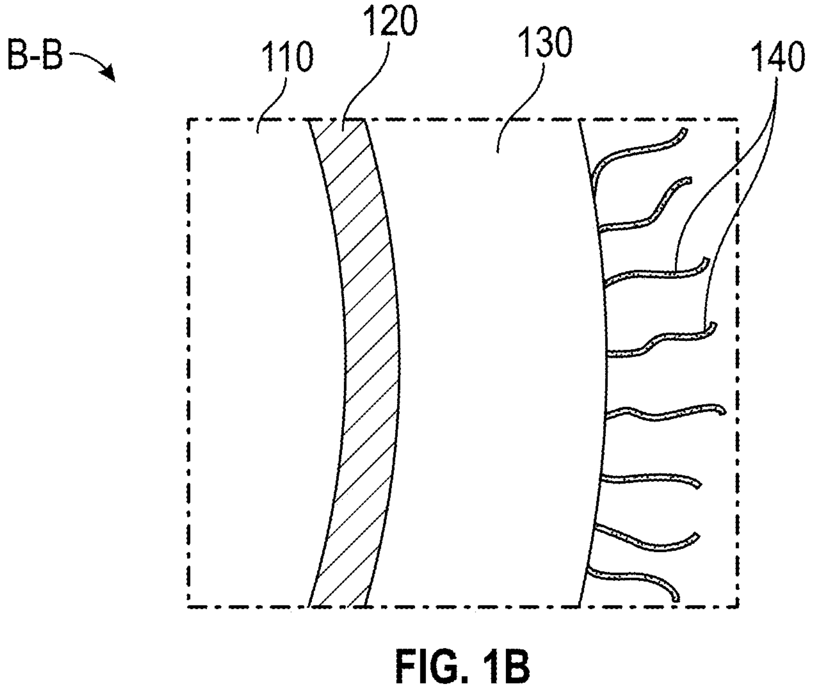
FIG. 1B is a magnified view of a portion (B-B) of the non-porous composite particle of FIG. 1A.

As previously noted, the present disclosure pertains to non-porous composite particles in which a bonding material is in contact with a non-porous hybrid organic-inorganic material, which is in contact with a modified surface of the non-porous polymer core. The modified surface of the non-porous polymer core, the non-porous hybrid organic-inorganic material, or a combination thereof may include the bonding material. For example, the modified surface and/or non-porous hybrid organic-inorganic material may be modified with the bonding material. The modification may be intrinsic modification (i.e., including the bonding material when depositing or growing material 120 or 130), surface modification (i.e., applying the modification to an exposed surface), or a combination thereof. For example, as shown in FIGS. 1A and 1B, in an embodiment 100 a non-porous hybrid organic-inorganic material 130 may be surface modified with a bonding material 140, forming a layer or region extending from the non-porous hybrid organic-inorganic material 130. In some cases, the bonding material 140 covalently or electrostatically bonds to the non-porous hybrid organic-inorganic material 130. In some cases, the bonding material 140 may have a thickness ranging from 0.1 nm to 200 nm. FIG. 1B shows a magnified view of a portion B-B of the non-porous composite particle of FIG. 1A. As can be seen from B-B, the modified surface 120 of the non-porous polymer core 110 is in contact with the non-porous hybrid organic-inorganic material 130, and the bonding material 140 is in contact with the non-porous hybrid organic-inorganic material 130.

Figure 2A:
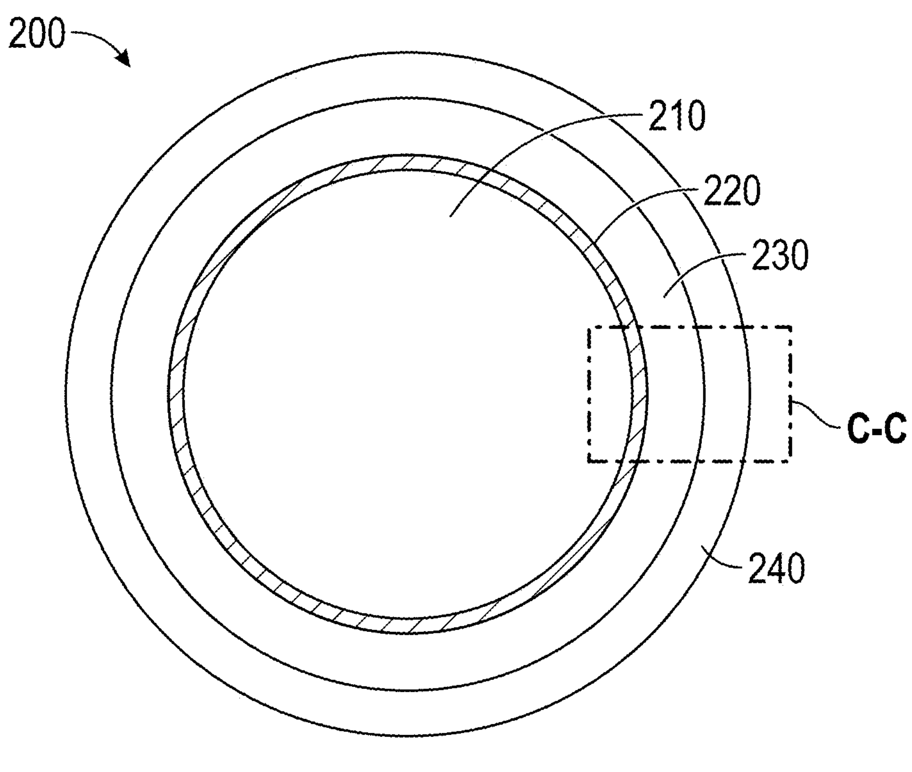
FIG. 2A is a cross-sectional schematic illustration of a non-porous composite particle, in accordance with another embodiment of the present disclosure.
Figure 2B:
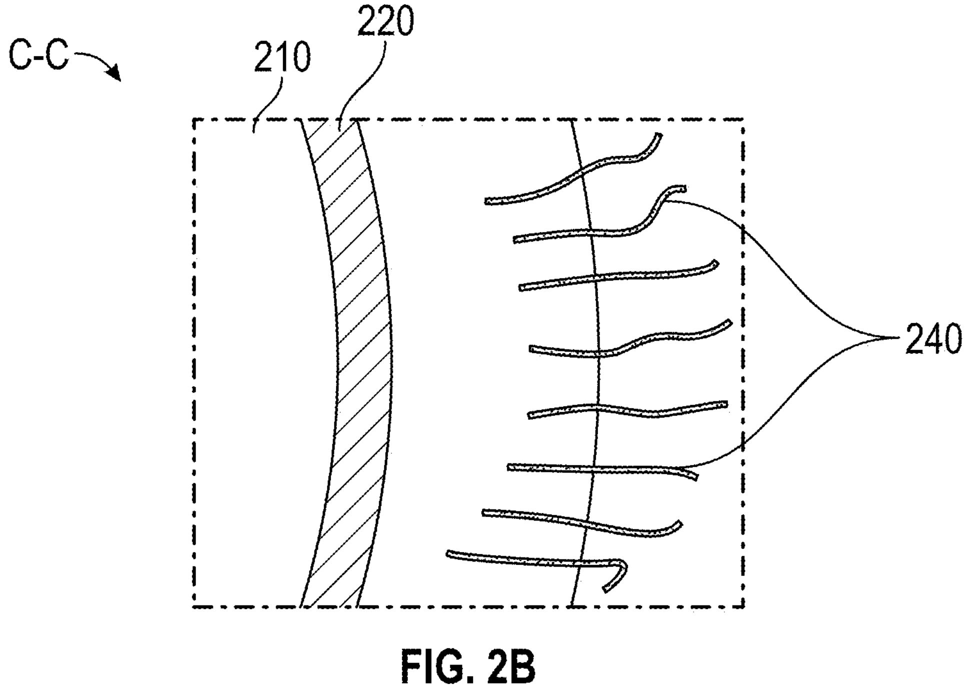
FIG. 2B a magnified view of a portion (C-C) of the non-porous composite particle of FIG. 2A.
Figure 2C:
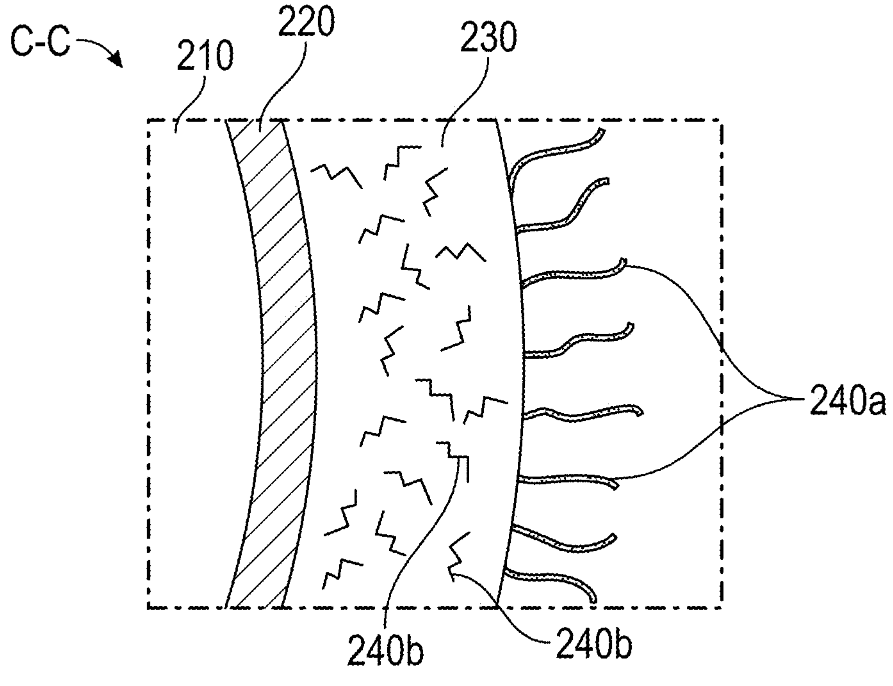
FIG. 2C is magnified view of another embodiment of portion (C-C) of the non-porous composite particle.

In another example, and as shown in FIGS. 2A, 2B and 2C, in an embodiment of a particle 200, a non-porous hybrid organic-inorganic material 230 is intrinsically modified, with a bonding material 240 extending at partially through the non-porous hybrid organic-inorganic material 230 (homogenously or as a gradient). The bonding material 240 may continue to be added even after growth of the non-porous hybrid organic-inorganic material 230 has stopped, to increase functionalization or to include different functionalization to the outer most surface of the non-porous composite particle 200. In some embodiments, the bonding material 240 extending within the non-porous hybrid organic-inorganic material 230 is the same as the bonding material that is added after growth of the non-porous hybrid organic-inorganic material 230. That need not be the case, however. In some embodiments, not shown, the bonding material 240 within the nonporous hybrid organic-inorganic material 230 is different than the bonding material extending passed the non-porous hybrid organic-inorganic material (e.g., an end cap is supplied outside of material 230, or a charge is added to create a charged surface).

FIG. 2B shows a magnified view of a portion C-C of the non-porous composite particle of FIG. 2A. As can be seen from C-C, the modified surface 220 of the non-porous polymer core 210 is in contact with the non-porous hybrid organic-inorganic material 230, and the bonding material 240 is in contact with the non-porous hybrid organic-inorganic material 230. Although not shown, in other embodiments, the non-porous hybrid organic-inorganic material 230 may be intrinsically modified with the bonding material 240 extending completely through the non-porous hybrid organic-inorganic material 230.

It is noted that FIG. 2B is merely a schematic. Bonding material 240, when incorporated within the non-porous hybrid organic-inorganic material 230 is typically not continuously deposited to create "strands" of bonding material that extend radially throughout the thickness of the non-porous hybrid organic-inorganic material 230. However, the bonding material 240 may extend into the non-porous hybrid organic-inorganic material 230 for some portion of the thickness. In certain preferred embodiments, "units" (i.e., ligands) of bonding material are incorporated and distributed within at least a portion of the non-porous hybrid organic-inorganic material 230. See, for example, FIG. 2C in which bonding material 240*b* is distributed within (i.e., intrinsically modified) the non-porous hybrid organic-inorganic material 230 and bonding material 240*a* is bonded to the surface (i.e., surface modified) of the non-porous hybrid organic inorganic material 230. The concentration or content of the bonding material 240*b* within the non-porous hybrid organic-inorganic material 230 can be consistent throughout its thickness or can be applied as a gradient and can also be exposed on the surface of the non-porous composite particle.

Figure 3A:
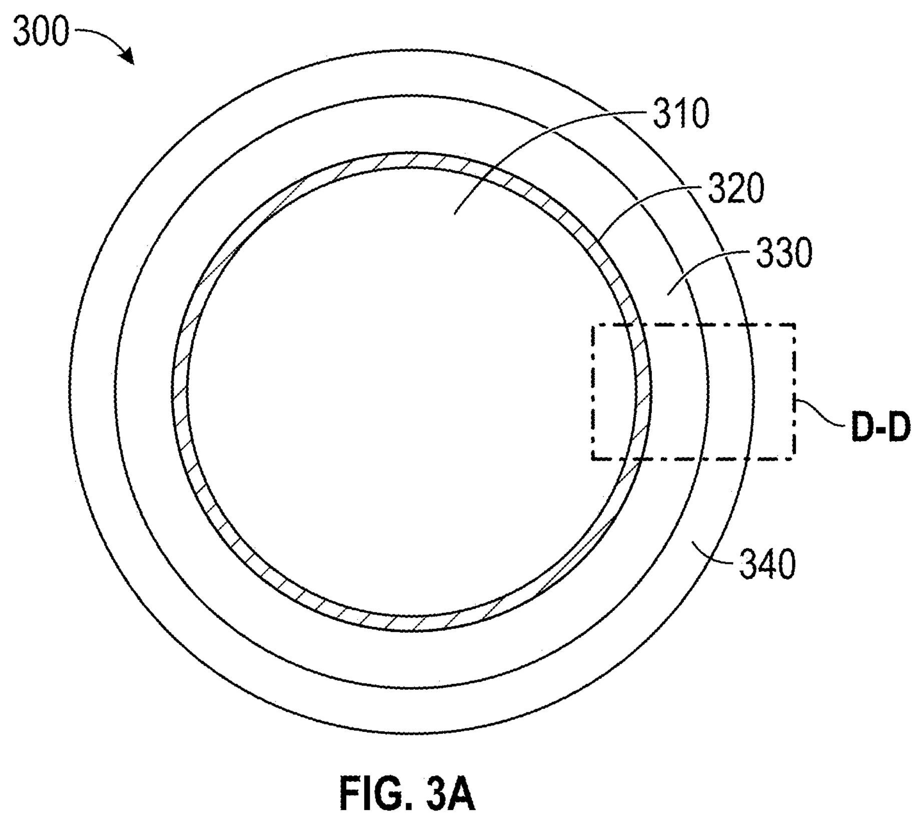
FIG. 3A is a cross-sectional schematic illustration of a non-porous composite particle, in accordance with another embodiment of the present disclosure.
Figure 3B:
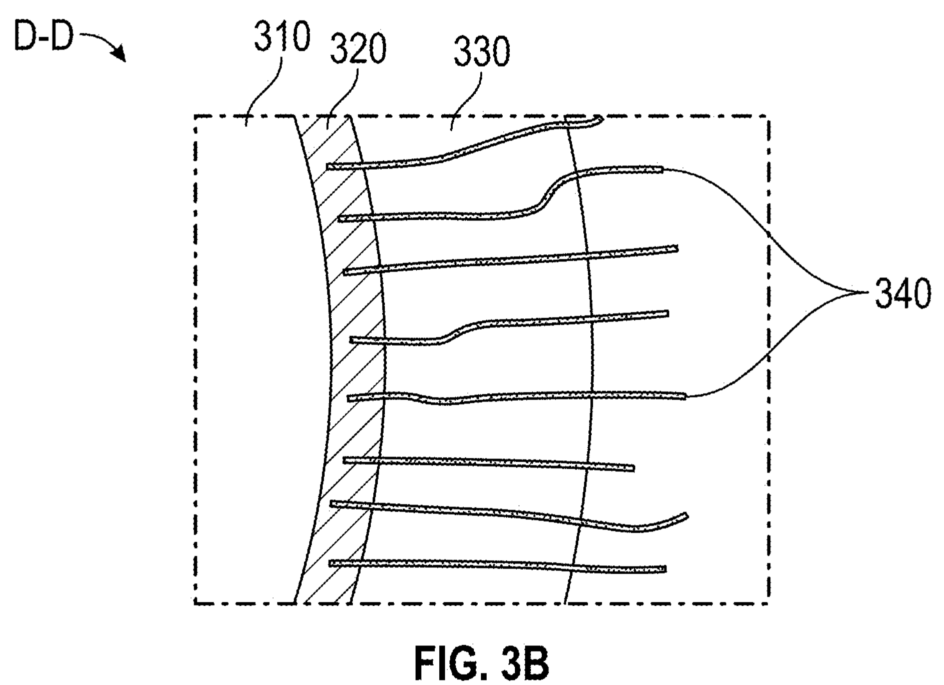
FIG. 3B is a magnified view of a portion (D-D) of the non-porous composite particle of FIG. 3A.

In yet another example, and as shown in FIGS. 3A and 3B, in an embodiment of a particle 300, a modified surface 320 and a non-porous hybrid organic-inorganic material 330 are intrinsically modified with a bonding material 340. That is, the bonding material 340 extends at least partially through the modified surface 330, extending completely through the non-porous hybrid organic-inorganic material 330, and further surface modifying the non-porous hybrid organic-inorganic material 330. FIG. 3B shows a magnified view of a portion D-D of the non-porous composite particle of FIG. 3A. As can be seen from D-D, the modified surface 320 of the non-porous polymer core 310 is in contact with the non-porous hybrid organic-inorganic material 330, and both the modified surface 320 and the non-porous hybrid organic-inorganic material 330 are in contact with the bonding material 340. Although not shown, in other embodiments, the modified surface 320 may be intrinsically modified with the bonding material 340 extending completely through the modified surface 320, the non-porous hybrid organic-inorganic material 330 may be intrinsically modified with the bonding material 340 extending partially through the non-porous hybrid organic-inorganic material 330, or a combination thereof. It should be noted that even though the bonding material is represented in FIG. 3B as "strands", the bonding material 340 is included as "units", such as shown in FIG. 2C. The bonding material 340 may be the same material or, in some embodiments, not shown, the bonding material 340 can be altered in one or more of the regions of particle 300 (e.g., a different bonding material in modified surface 320, as compared to within non-porous hybrid organic-inorganic material 330, as compared to extending outward (away from the core 310) from the non-porous hybrid organic-inorganic material 330).

Other embodiments of the non-porous composite particles also fall within the present technology. While the embodiments shown in FIGS. 1A-3B included a non-porous hybrid organic-inorganic material, particles in accordance with the technology need not include this material. For example, non-porous composite particle 400 shown in FIGS. 4A and 4B includes a non-porous polymer core 410, a modified surface 420 (e.g., a silyl modified surface) of the non-porous polymer core 410, and bonding material 440.

Figure 4A:
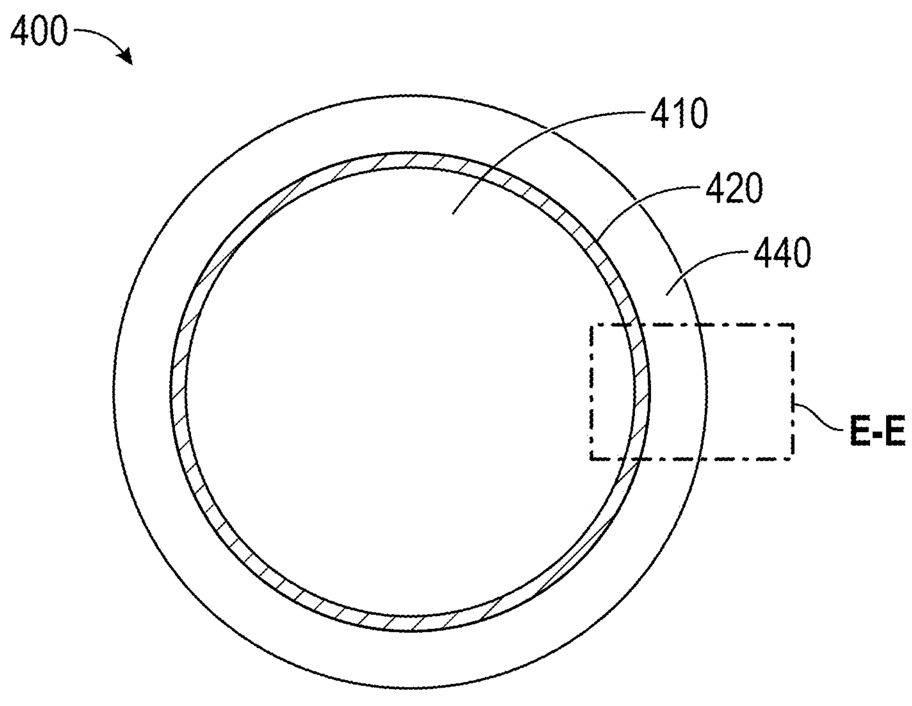
FIG. 4A is a cross-sectional schematic illustration of a non-porous composite particle, in accordance with another embodiment of the present disclosure.
Figure 4B:
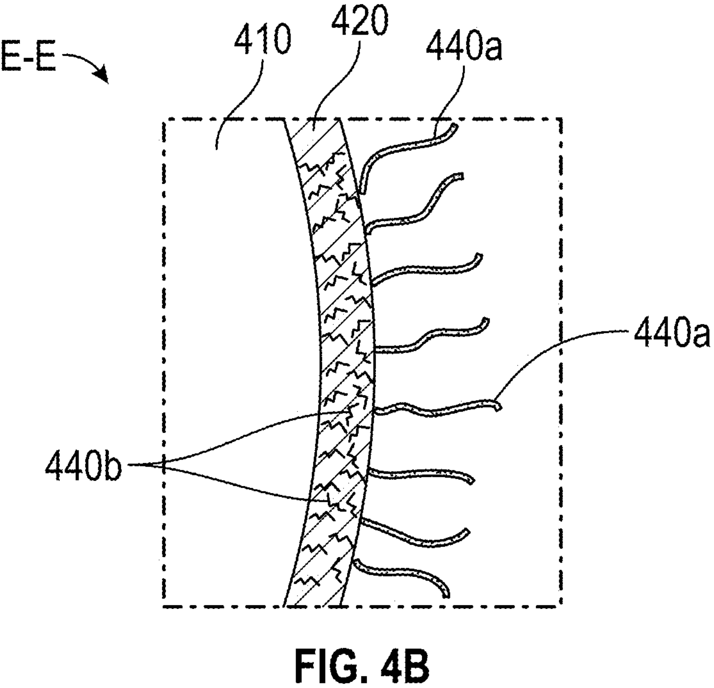
FIG. 4B is a magnified view of a portion (E-E) of the non-porous composite particle of FIG. 4A.

FIG. 4B shows a magnified view of a portion E-E of the non-porous composite particle of FIG. 4A. As can be seen from E-E, the modified surface 420 of the non-porous polymer core 410 includes bonding material 440*b* (i.e., intrinsically modified) and bonding material 440*a* (i.e., surface modification). It is possible for the modified surface 420 to include the bonding material 440 through either surface modification or through intrinsic modification (i.e., both intrinsic and surface modification need not be required as shown in FIG. 4B). In embodiments which include intrinsic modification of the modified surface 420, the bonding material can be included as a gradient.

The bonding material may be functionalized (e.g., tailored or tuned) for particular chromatographic separations or modes (Slalom, HDC, IP-RPLC, Ion-Exchange). In some cases, at least a portion of the bonding material is a silane. The bonding material may be hydrophobic, hydrophilic, positively and/or negatively charged, or a combination thereof. In some cases, at least a portion of the bonding material may be an ionizable silane. The bonding material may include, but is not limited to, alkyl groups (e.g., C4 to C20), polyethylene glycols, hydrophilic polymers based on acrylamide and (meth)acrylate, polar groups containing nitride, nitrile, hydroxyl, negatively and/or positively charged groups, amino, chloro, or alkoxysilanes, or combinations thereof.

In some embodiments, the bonding material may be incorporated into non-porous composite particle homogenously, with the bonding material deposited in sync (i.e., intrinsically modified) and/or after the modified surface and/or non-porous hybrid organic-inorganic material is deposited, and/or the bonding material may be incorporated into the non-porous composite particle as a gradient, with the bonding material deposited after deposition of the modified surface and/or non-porous hybrid organic-inorganic material has started, but before deposition has ended. In some embodiments, the modified surface and/or non-porous hybrid organic-inorganic material may have a concentration or amount of bonding material that varies along a thickness of the surface and/or material. In some cases, the bonding material may be incorporated into the silyl modified surface of the non-porous polymer particle core as a gradient with silane-based bonding. (See, for example US Patent Publication US 2019/0322783.) In some cases, at least a portion of the bonding material is a silane. The bonding material may be hydrophobic, hydrophilic, positively and/or negatively charged, or a combination thereof. In some cases, at least a portion of the bonding material may be an ionizable silane.

As used herein the term "gradient" refers to the composition of the particles as viewed from the direction of the center of the particle to the particle surface. In a gradient material, the composition of the material is varied based on the order and concentration of monomers added in a predetermined pattern such that there is composition variance along the radius of the particle but without the formation of discrete shells of material. For example, the material(s) of the polymer particles may have a unique gradient composition across the radius from the particle nucleus to the outermost surface, wherein the composition gradient includes, but not limited to, hydrophobic/hydrophilic gradient, crosslinking ratio gradient, functional group gradient, charge ratio gradient, density gradient, or a combination thereof.

In some embodiments, divinylbenzene may be used to synthesize the non-porous polymer particle core. For example, the surface of the divinylbenzene particle core may be modified with a styrenic trimethoxysilane. In some cases, the modified divinylbenzene particle core surface may be then coated with an ethylene bridge hybrid (hybrid organic-inorganic) compound and bonded to achieve base stable particles for chromatographic bio-molecular separations.

In some embodiments, a method for separating large macromolecules is provided. The method may include performing one or more of: slalom, hydrodynamic, reversed phase, hydrophilic interaction, ion exchange, or mixed mode chromatography using the non-porous composite particle as disclosed herein, on large macromolecules, such as DNA, nucleic acids, proteins and their macromolecular complexes.

Potential advantages of the non-porous composite particles of the present disclosure include improvements in mass transfer and increased efficiencies relative to non-porous particles, along with improved pH stability. The non-porous composite particles can be used as chromatography packing materials for the separation of both small molecules and large biologics.

Chromatographic Devices.

In some aspects of the present disclosure, the non-porous composite particles described herein may be provided in a suitable chromatographic device. For this purpose, the non-porous composite particles described herein may be provided in conjunction with a suitable housing. The non-porous composite particles and the housing may be supplied independently, or the non-porous composite particles may be pre-packaged in the housing. Housings for use in accordance with the present disclosure commonly include a chamber for accepting and holding non-porous composite particles. In various embodiments, the housings may be provided with an inlet and an outlet leading to and from the chamber.

Suitable construction materials for the chromatographic housings include inorganic materials, for instance, metals such as stainless steel and ceramics such as glass, as well as synthetic polymeric materials such as polyethylene, polypropylene, polyether ether ketone (PEEK), and polytetrafluoroethylene, among others.

In certain embodiments, the chromatographic housings may include one or more filters which act to hold the non-porous composite particles in a housing. Exemplary filters may be, for example, in a form of a membrane, screen, frit or spherical porous filter.

In certain embodiments, the chromatographic device is a chromatographic column.

The present disclosure also provides for a kit comprising the non-porous composite particles, housings or devices as described herein and instructions for use. In one embodiment, the instructions are for use with a separation device, e.g., a chromatographic column.

Chromatographic Separations.

In some aspects of the present disclosure, the non-porous composite particles of the present disclosure can be used in a variety of chromatographic separation methods. As such, the chromatographic devices and chromatographic kits described herein can also be utilized for such methods. Examples of chromatographic separation methods in which the non-porous composite particles of the invention can be used include used in both high-pressure liquid chromatography (HPLC) and ultra-high pressure liquid chromatography (UHPLC) in different modes. Those modes include, but are not limited to, affinity separation, hydrophilic interaction chromatography (HILIC) separations, normal-phase separations, reversed-phase separations, chiral separations, supercritical fluid chromatography SFC separations, perfusive separations, size-exclusion chromatography (SEC) separations, ion exchange separations, or multimode separations.

The non-porous composite particles, devices and kits of the present disclosure may be used for chromatographic separations of small molecules, carbohydrates, antibodies, whole proteins, peptides, and/or DNA, among other species.

Such chromatographic separations may comprise loading a sample onto non-porous composite particles in accordance with the present disclosure and eluting adsorbed species from the non-porous composite particles with a mobile phase.

Such chromatographic separations may be performed in conjunction with a variety of aqueous and/or organic mobile phases (i.e., in mobile phases that contain water, an organic solvent, or a combination of water and organic solvent) and in conjunction with a variety of mobile phase gradients, including solvent species gradients, temperature gradients, pH gradients, salt concentration gradients, or gradients of other parameters.

The following examples are provided to illustrate how to make composite particles and their components in accordance with the present technology. The examples are provided for illustrative purposes only and should not be considered to be limiting. When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the present technology be limited to the specific values recited when defining a range.

Example 1. Preparation of Non-Porous Particles for Bioseparation

In this example, an exemplary non-porous composite particle that is particularly beneficial in separation of biomolecules is manufactured. Other processes and other materials can be utilized for making the non-porous composite particle of the present technology.

Particle core synthesis: In this particle core synthesis, non-porous, divinylbenzene 80% (DVB80) core particles were synthesized in ethanol by radical polymerization using azobisisobutyronitrile (AIBN) as an initiator. A styrenic monomer with a terminal trimethoxylsilane group and DVB were used to prime the core by copolymerization with the residual pendant C═C double bonds on the core surface.

The surface was then further modified with inorganic-organic ethylene bridged hybrid (BEH) having an empirical formula $SiO_2(O_{1.5}SiCH_2CH_2SiO_{1.5})_{0.25}$ to achieve non-porous, chemically stable particles, which could be used as a chromatographic stationary phase as-prepared or be further functionalized for alternative modes of chromatographic separations.

Table 1, below, presents various materials formed using a similar procedure as described above. Specifically, the procedure of Example 1 details how to make material 1C, a DVD silanized with BEH coated surface particle. To compare material 1C to other non-porous particles, the inventors also made material 1A, a DVB particle, and material 1B a DVB particle with silanized surface.

TABLE 1

| Material | Core Particle Description | Core Particle Surface Area ($m^2/g$) |
|---|---|---|
| 1A | DVB | 1.7 |
| 1B | DVB with silanized surface | 2.0 |
| 1C | DVB silanized with BEH coated surface | 2.4 |

Surface Functionalization (Bonding): Non-porous, DVB80 particles as described above were further modified using amino, chloro, or alkoxysilanes (8-200 $\mu mol/m^2$) in toluene under anhydrous conditions with and without the use of a catalyst (imidazole, HCl) to achieve surfaces for a variety of chromatographic separation modes (Slalom, HDC, IP-RPLC, WAX). That is, the fluid contacting surface of the non-porous composite particles are tailored with a material tuned for particular separation modes.

Hydrophilic Surface: Non-porous DVB 80 particles modified with bridged-ethylene hybrid as described above were further modified to achieve a hydrophilic surface using a hydroxy-terminated polyethylene glycol (HO-PEG) silane. To form this surface, the NP DVB particles were dispersed in toluene (10 mL/g) under anhydrous conditions. Concentrated hydrochloric acid (20 $\mu L/g$ particles) was added followed by [hydroxy(polyethyleneoxy)$_{8-12}$propyl]triethoxysilane (HO-PEG; 200 $\mu mol/m^2$). The reaction was heated to 110° C. for 20 h, then cooled to RT. The particles were isolated via filtration then subsequently washed with toluene, ethanol, and water.

Following the bonding reaction, hydrolysis of remaining ethoxysilyl groups was performed using ammonium bicarbonate (100 mM) at 100° C. for 3 h. The reaction was cooled to RT and the particles were isolated via filtration. The particles were subsequently washed with water to reduce the pH<6 then washed with acetone before drying under vacuum at 70° C. for 16 h.

Hydrophobic Surface: Non-porous DVB 80 particles modified with bridged-ethylene hybrid as described above were further modified to achieve a hydrophobic surface using alkyl silanes. To form this surface, the NP DVB particles were dispersed in toluene (10 mL/g) under anhydrous conditions with 8 $\mu mol/m^2$ Butyldimethyl(dimethylamino)silane (mC4) or Octyldecyltrichlorosilane (tC18). A catalyst (Imidazole; 10 $\mu mol/m^2$) was added with the latter. The reaction was heated to 110° C. for 20 h, then cooled to RT. The particles were isolated via filtration then washed with toluene, acetone, and water. Following the bonding reaction, hydrolysis was performed on the trifunctional C18 phase using ammonium bicarbonate (100 mM) and acetone (40:60 v/v) at 50° C. for 2 h. The reaction was cooled to RT and the particles were isolated via filtration. The particles were then washed with toluene, acetone, and water then dried under vacuum at 70° C. for 16 h.

Remaining surface silanols were endcapped using either hexamethyldisilazane (HMDS; neat 200° C., 20 h) or with a combination of (N,N-dimethylamino)triethylsilane (TES; 5 $\mu mol/m^2$) and (N,N-dimethylamino)trimethylsilane (TMS; 8 $\mu mol/m^2$) in toluene (10 mL/g) for 4 h at 110° C. Particles were isolated via filtration then washed with toluene, acetone, and water and dried under vacuum at 70° C. for 16 h.

Charged Surface: Non-porous DVB 80 particles modified to have a phenyl-silanized surface or bridged-ethylene hybrid surface as described above were further modified to achieve a charged surface using an ionizable silane. To form this surface, the NP DVB particles were dispersed in toluene (10 mL/g) under anhydrous conditions with bispropylmethylaminotrimethoxysilane (BPMA; 8 $\mu mol/m^2$). The reaction was heated to 110° C. for 20 h, then cooled to RT. The particles were isolated via filtration then washed with toluene, acetone, and water before drying under vacuum at 70° C. for 16 h.

Table 2, below, presents various materials formed using a similar procedure as described above. Specifically, the procedure of Example 1 details how to functionalize the surface of material 1C to make materials 2C-2F. To compare materials 2C-2F to other non-porous particles, the inventors also made material 2A, a silanized DVB particle with a bridged-ethylene hybrid surface, and material 2B a DVB particle with silanized surface.

TABLE 2

| Material | Core | Surface Modifier 1 | Surface Modifier 2 |
|---|---|---|---|
| 2A | DVB silanized with BEH coated surface | — | — |
| 2B | DVB with silanized surface | BPMA | — |
| 2C | DVB silanized with BEH coated surface | BPMA | — |
| 2D | DVB silanized with BEH coated surface | HO-PEG | — |
| 2E | DVB silanized with BEH coated surface | mC4 | HMDS |
| 2F | DVB silanized with BEH coated surface | tC18 | TES/TMS |

Example 2. Size-Based Separation/Slalom Chromatography of DNA with a BEH-DVB Particle Column and Tris Buffered Saline Mobile Phase In this example, a chromatographic separation is conducted with a non-porous composite particle, prior to the addition or formation of a bonding material disclosed herein. Other processes and other materials can be utilized for performing this chromatographic separation based on the technology described herein.

Figure 5:
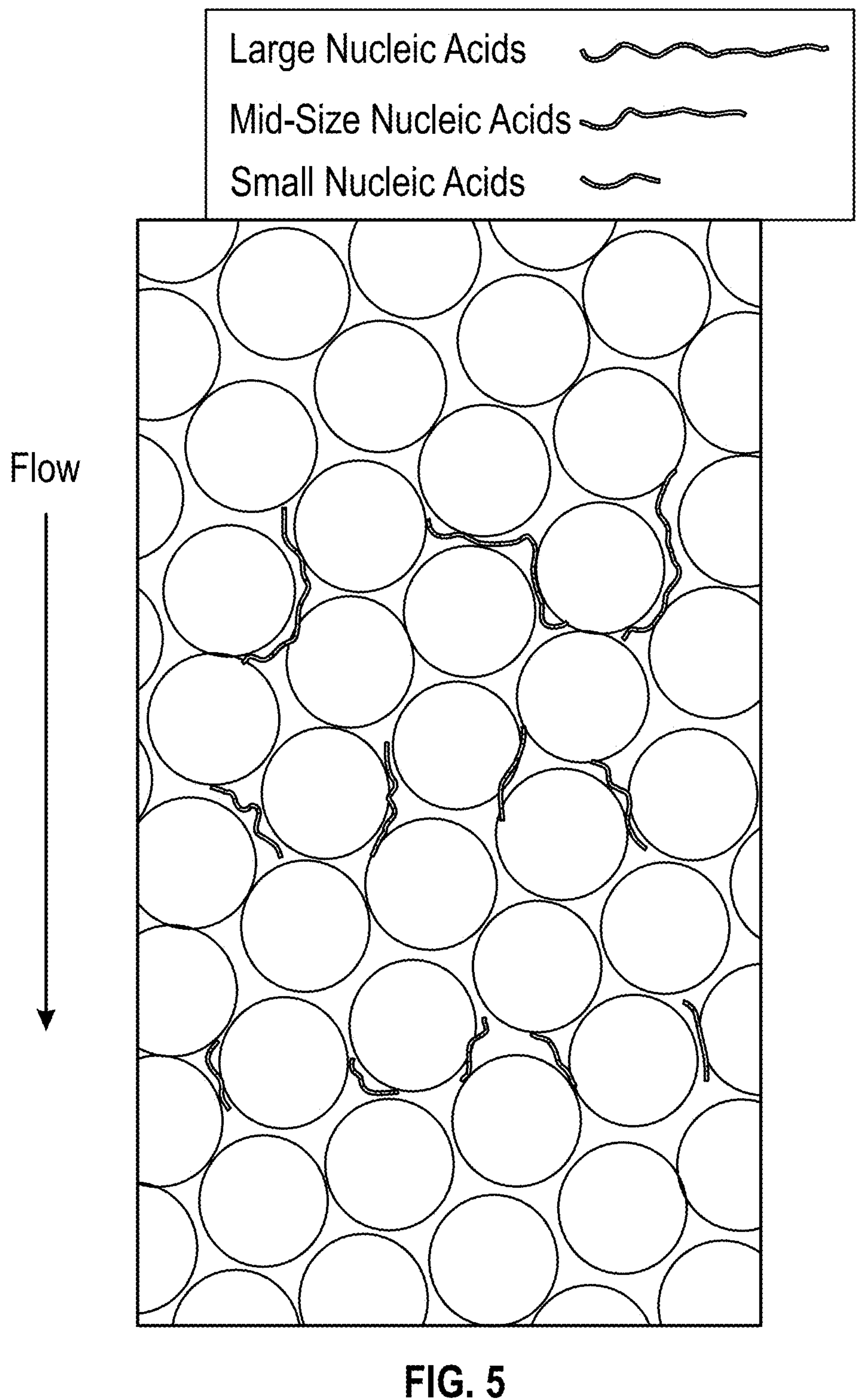
FIG. 5 is a schematic of the flow dynamics according to example 2.

Slalom chromatography is a form of sizing separation first coined by Hirabayashi et al in 1990. FIG. 5 presents a schematic representation of the flow dynamics that were discovered to take place upon injecting a nucleic acid sample onto a non-porous particle packed bed. In this separation, flow dynamics, entropy and physical filtration phenomenon bring smaller nucleic to elute before large nucleic acids.

Example 3. Slalom Chromatography of DNA with a BEH-DVB Particle Column

In this example, slalom chromatography was performed on nuclease treated λ bacteriophage DNA, prior to the addition or formation of a bonding material disclosed herein. Here, a higher volume injection was performed for peak fractionation and to facilitate secondary analyses based on charge detection mass spectrometry and pulsed field gel electrophoresis.

Figure 6:
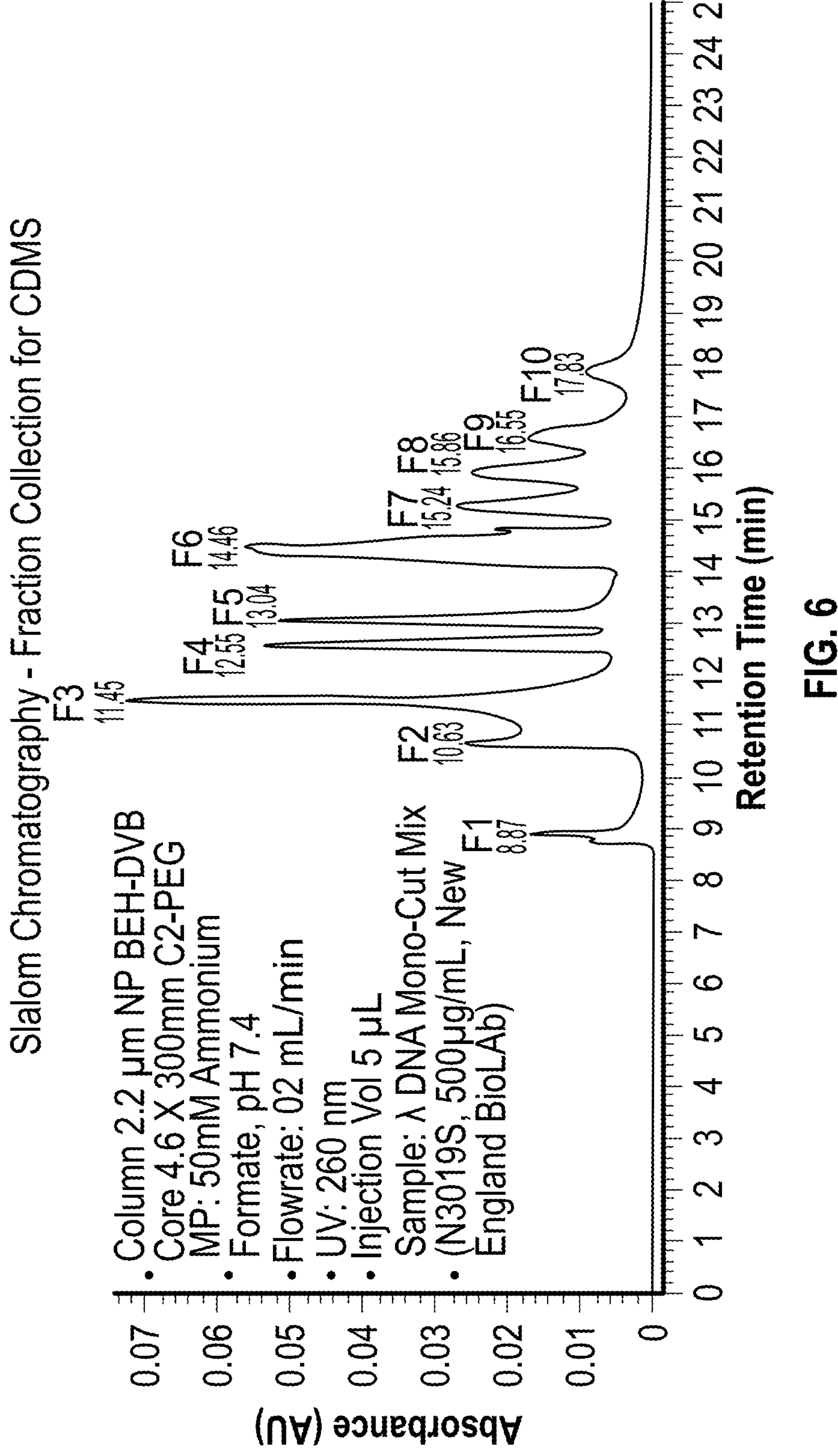
FIG. 6 is a chromatogram of a slalom chromatographic separation of nuclease treated λ bacteriophage DNA described in example 3.
Figures 7A, 7B:
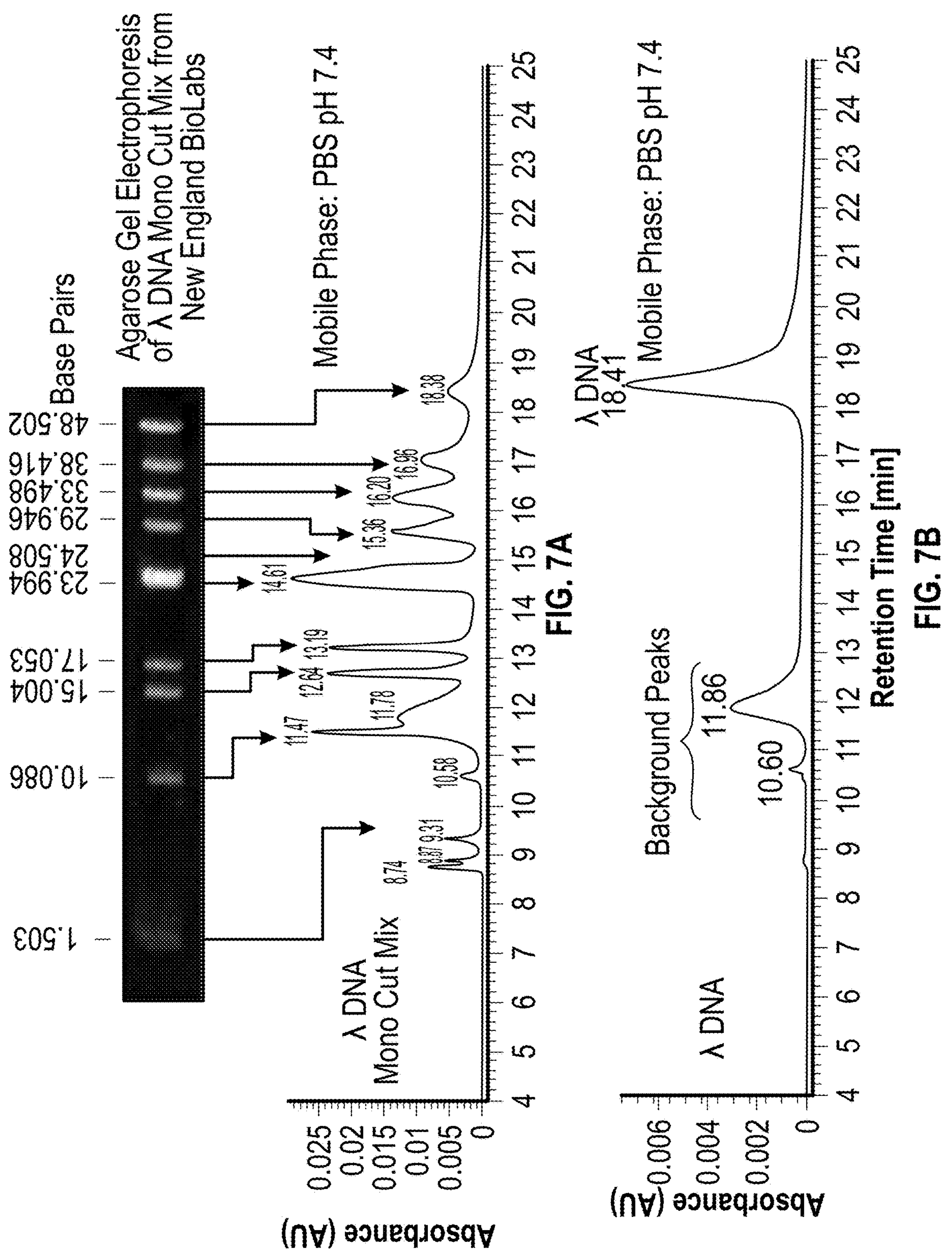
FIG. 7A is another chromatogram of a slalom chromatographic separation of nuclease treated λ bacteriophage DNA described in example 3 together with gel electrophoresis results.
FIG. 7B a chromatogram of a slalom chromatographic separation of untreated λ bacteriophage DNA described in example 3.

Untreated and nuclease treated λ bacteriophage DNA were obtained from New England Biolabs (N3011 and N3019; Ipswich, MA). Samples were chromatographed with an Acquity Premier LC and 4.6×300 mm columns constructed from hydrophilic high performance surface hardware components and BEH-DVB particles (Material 1C) at room temperature. Ammonium formate with a pH of 7.4 was used as the mobile phase. The flow rate was 0.2 mL/min, with an injection volume of 5 μL and a detection of UV 260 nm. The chromatographic results are presented in FIG. 6 for the nuclease treated λ bacteriophage DNA sample. The same particles (Material 1C) were used in a chromatographic separation similar to that provided above, however instead of using ammonium formate as the mobile phase phosphate buffered saline (PBS) at a pH of 7.4 was used. The results are provided in FIGS. 7A and 7B, with FIG. 7A providing gel electrophoresis results as well as chromatographic results for the nuclease treated λ bacteriophage DNA sample and FIG. 7B providing a chromatogram of the untreated sample.

Example 4. Ion Pairing Reversed Phase of Nucleic Acid with C18 BEH DVB Particles In this example, ion pairing reversed phase chromatography was performed using C18 bonded BEH coated, silanized DVB particles. Other processes and other materials can be utilized for performing this chromatographic separation based on the technology described herein.

A column containing reversed phase C18 bonded BEH coated, silanized DVB particles (Material 2F, Table 2 above) was prepared and used for ion pairing reversed phase liquid chromatography (IP-RPLC) separations of deoxythymidine oligomers. Particles were packed into a 2.1×150 mm stainless steel column with a flow rate of 0.3 mL/min at 60° C. Mobile phase A comprised 110 mM octylammonium acetate in 40% acetonitrile, and mobile phase B comprised 110 mM octylammonium acetate in 95% acetonitrile. 20-50 μmole of sample was injected, with the sample being 20, 30, 40, 50, 60, 80 and 100 nt oligodeoxythymidines. The gradient was 0 to 72.7% B (40-80% acetonitrile) in 20 min and 2% acetonitrile/min. The results are provided in FIG. 8.

Figures 8, 9:
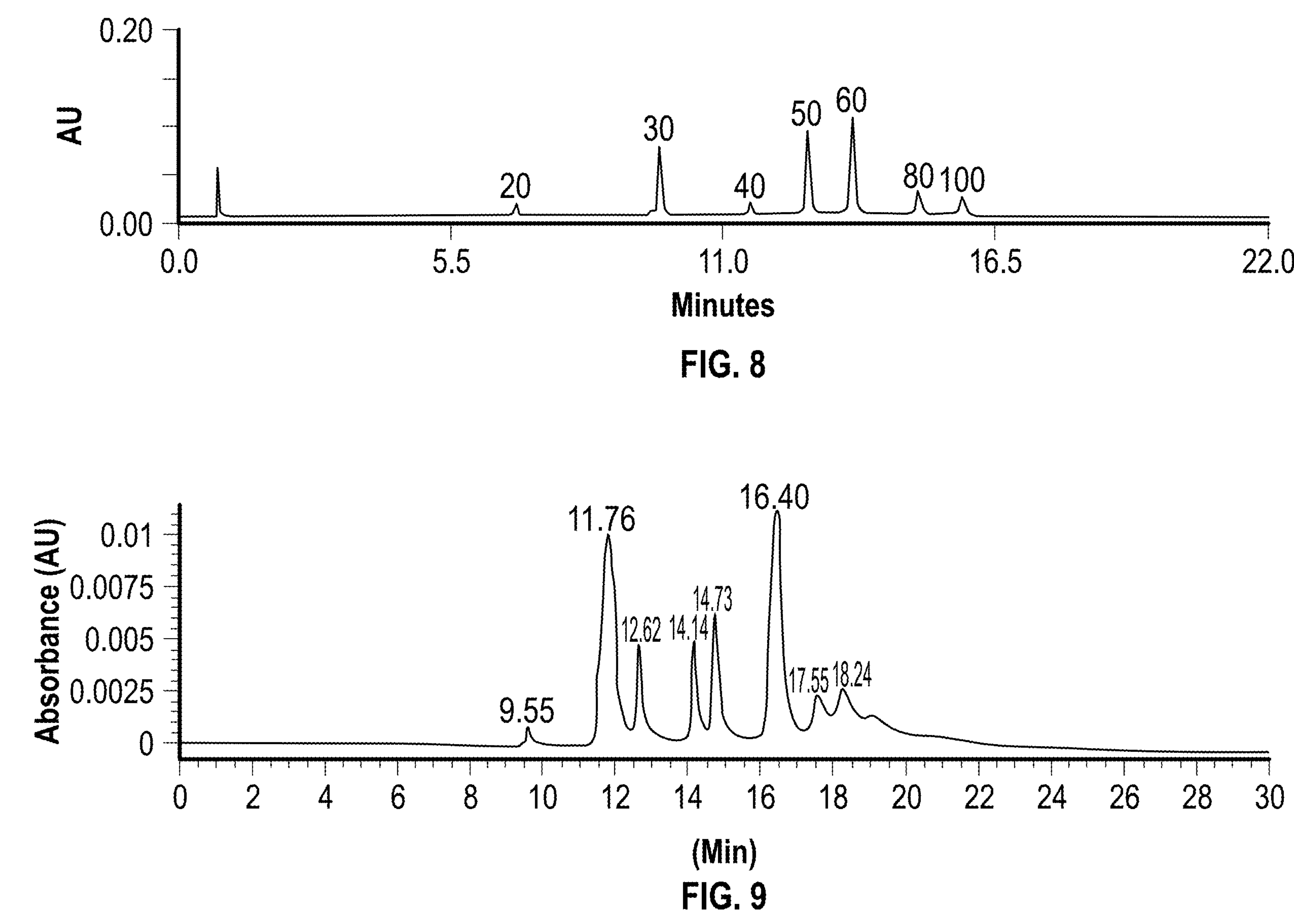
FIG. 8 is an ion pairing reversed phase chromatogram of 20 to 100 mer deoxythymidine oligomers as obtained in example 4.
FIG. 9 is a chromatogram of a separation described in example 5.

Example 5. Size-Based Separation/Slalom Chromatography of Nucleic Acid with HO-PEO Bonded BEH DVB Particles Columns prepared with HO-PEO bonded BEH DVB particles (Material 2D) were used for size-based separations of large nucleic acid species. HO-PEO bonded BEH DVB particles (2.2 μm) were packed into 2.1×300 mm columns constructed from hydrophilic high performance surface hardware components. See, US2022-0118443 describing C2PEG coatings for providing hydrophilic chromatography components, and hereby incorporated by reference in its entirety. Separation conditions were as follows: isocratic at room temperature with a flow rate of 0.04 mL/min with PBS at a pH of 7.4. A TUV detector at 260 nm was used to evaluate the separation of the sample (0.2 μL λ DNA mono-cut mix from New England BioLabs, Inc., Ipswich, MA). Chromatographic results from this example are depicted in FIG. 9.

Example 6. Weak Anion Exchange of Nucleic Acid

In this example, a chromatographic separation is conducted with an exemplary non-porous composite particle disclosed herein. Other processes and other materials can be utilized for performing this chromatographic separation based on the technology described herein.

A column prepared with weak anion exchange (WAX) BEH DVB particles was used for ion exchange-based separations of large nucleic acid species. In this example, BPMA bonded BEH DVB particles (Material 2C, Table 2) were packed into 2.1×50 mm stainless steel columns constructed from hydrophilic high performance surface hardware components. Several different separation techniques were applied, including salt gradients, ion pairing anion exchange (IPAX) and pH gradients, and combinations thereof. For pH gradient chromatography, online effluent pH response was used to empirically correct gradient composition deliveries and thereby produce linear pH gradients for all applied mobile phase compositions. Separations were performed on intact and nuclease treated λ bacteriophase DNA as well as intact mRNA and nuclease digested mRNA. The following experimental conditions were used to conduct the separations on an Acquity Premier Quaternary LC system (Waters Corporation, Milford, MA), the injected volume of the sample was 1 μL at a flow rate of 0.2 mL/min. The column temperature was at room temperature. Mobile phase A was 20 mM Tris having a pH of 7.5 and mobile phase B was 20 mM Tris at pH 7.5 with 1 M NaCl. A mobile phase gradient of 2 to 80% B was applied over 25 min. A UV detector (260 nm) was used to detect the separation.

The invention claimed is:

1. A non-porous composite particle comprising:

a non-porous polymer particle core having a silyl modified surface;

a non-porous hybrid organic-inorganic material in contact with the silyl modified surface; and a bonding material in contact with the non-porous hybrid organic-inorganic material.

2. The particle of claim 1, wherein the non-porous polymer particle core comprises divinylbenzene 80%.

3. The particle of claim 1, wherein at least a portion of the non-porous hybrid organic-inorganic material is bonded to the silyl modified surface of the non-porous particle core through silane-based bonding.

4. The particle of claim 1, wherein at least a portion of the non-porous hybrid organic-inorganic material is a silane to form a functionalized surface.

5. The particle of claim 4, wherein the functionalized surface of the non-porous hybrid organic-inorganic material is hydrophilic.

6. The particle of claim 4, wherein the silane comprises a hydroxy-terminated polyethylene glycol (HO-PEG) silane.

7. The particle of claim 1, wherein at least a portion of the non-porous hybrid organic-inorganic material is an ionizable silane to form a functionalized surface.

8. The particle of claim 7, wherein the functionalized surface of the non-porous hybrid organic-inorganic material is charged.

9. The particle of claim 1, wherein the silyl modified surface of the non-porous polymer particle core comprises a first functionality and a second functionality, the first functionality comprising a reactive silane and the second functionality comprising an organic polymerizable group.

10. The particle of claim 9, wherein the reactive silane comprises an alkoxy, and the organic polymerizable group comprises vinyl.

11. The particle of claim 1, wherein the non-porous polymer particle core comprises at least 95% organic polymer.

12. The particle of claim 1, wherein the non-porous polymer particle core has a polymer backbone comprising C—C covalent bonds, C—O covalent bonds, C—N covalent bonds, O—N covalent bonds, or combinations thereof.

* * * * *